(12) United States Patent
Bauer

(10) Patent No.: US 9,429,061 B2
(45) Date of Patent: Aug. 30, 2016

(54) METHOD FOR METERING A REDUCING AGENT INTO AN EXHAUST-GAS TREATMENT DEVICE, EXHAUST-GAS TREATMENT DEVICE AND MOTOR VEHICLE

(71) Applicant: EMITEC GESELLSCHAFT FUER EMISSIONSTECHNOLOGIE MBH, Lohmar (DE)

(72) Inventor: Peter Bauer, Siegburg (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 54 days.

(21) Appl. No.: 14/589,065

(22) Filed: Jan. 5, 2015

(65) Prior Publication Data

US 2015/0113956 A1   Apr. 30, 2015

Related U.S. Application Data

(63) Continuation of application No. PCT/EP2013/062875, filed on Jun. 20, 2013.

(30) Foreign Application Priority Data

Jul. 4, 2012   (DE) .................. 10 2012 105 952

(51) Int. Cl.
*B01D 53/94* (2006.01)
*F01N 11/00* (2006.01)
(Continued)

(52) U.S. Cl.
CPC ........... *F01N 3/208* (2013.01); *B01D 53/9431* (2013.01); *F01N 9/00* (2013.01); *F01N 11/00* (2013.01); *F01N 2610/146* (2013.01); *F01N 2900/08* (2013.01); *F01N 2900/1402* (2013.01); *F01N 2900/1602* (2013.01); *Y02T 10/24* (2013.01); *Y02T 10/47* (2013.01)

(58) Field of Classification Search
CPC .......... F01N 3/208; F01N 11/00; F01N 9/00; F01N 2900/1402; F01N 2610/146; F01N 2900/08; F01N 2900/1602; B01D 53/9431; Y02T 10/24; Y02T 10/47
See application file for complete search history.

(56) References Cited

U.S. PATENT DOCUMENTS

| 8,191,357 B2 | 6/2012 | Döring et al. |
| 8,225,595 B2 | 7/2012 | Garimella et al. |

(Continued)

FOREIGN PATENT DOCUMENTS

| DE | 102007045263 A1 | 4/2009 |
| DE | 102008036885 A1 | 2/2010 |

(Continued)

*Primary Examiner* — Thomas Denion
*Assistant Examiner* — Brandon Lee
(74) *Attorney, Agent, or Firm* — Laurence A. Greenberg; Werner H. Stemer; Ralph E. Locher

(57) ABSTRACT

A method for metering reducing agent to an exhaust gas treatment device having a feed point and an SCR catalytic converter converting nitrogen oxide compounds in the exhaust gas, includes at least: a) calculating the following target conversion rates indicating what fraction of the nitrogen oxide compounds in the exhaust gas can be converted by the catalytic converter: a first rate determined from the power output of an internal combustion engine; a second rate determined from the mass flow of nitrogen oxide compounds in purified exhaust gas; and a third rate determined from a ratio of quantities of nitrogen oxide compounds upstream and downstream of the catalytic converter; b) selecting the lowest rate; c) determining the dosing quantity of reducing agent for the selected rate; and d) dosing the determined dosing quantity into the exhaust gas treatment device. An exhaust-gas treatment device and a motor vehicle are also provided.

9 Claims, 2 Drawing Sheets

(51) Int. Cl.
   *F01N 3/20*   (2006.01)
   *F01N 9/00*   (2006.01)

(56) References Cited

U.S. PATENT DOCUMENTS

| | | |
|---|---|---|
| 2009/0133384 A1 | 5/2009 | Devarakonda et al. |
| 2010/0024389 A1 | 2/2010 | Gady et al. |
| 2010/0101215 A1 | 4/2010 | Wu et al. |
| 2011/0113753 A1 | 5/2011 | Christner et al. |
| 2012/0079812 A1 | 4/2012 | Masaki |

FOREIGN PATENT DOCUMENTS

| | | |
|---|---|---|
| DE | 102009012093 A1 | 9/2010 |
| EP | 2187009 A2 | 5/2010 |
| EP | 2444612 A1 | 4/2012 |
| WO | 2009040307 A1 | 4/2009 |
| WO | 2010065963 A2 | 6/2010 |

METHOD FOR METERING A REDUCING AGENT INTO AN EXHAUST-GAS TREATMENT DEVICE, EXHAUST-GAS TREATMENT DEVICE AND MOTOR VEHICLE

CROSS-REFERENCE TO RELATED APPLICATION

This is a continuation, under 35 U.S.C. §120, of copending International Application No. PCT/EP2013/062875, filed Jun. 20, 2013, which designated the United States; this application also claims the priority, under 35 U.S.C. §119, of German Patent Application DE 10 2012 105 952.7, filed Jul. 4, 2012; the prior applications are herewith incorporated by reference in their entirety.

BACKGROUND OF THE INVENTION

Field of the Invention

The invention relates to a method for metering a reducing agent into an exhaust-gas treatment device, in which the reducing agent is metered by using model-based regulation. The invention also relates to an exhaust-gas treatment device and a motor vehicle.

The so-called SCR (selective catalytic reduction) method is used for the reduction of nitrogen oxide compounds in the exhaust gas of mobile internal combustion engines. In that case, a reducing agent which has ammonia, or a reducing agent precursor that can be converted to ammonia, is added to the exhaust gas, and the nitrogen oxide compounds are converted in an SCR catalytic converter to form nitrogen and water. In that method, it is desirable to set a stoichiometric ratio between the ammonia and the nitrogen oxide compounds in the exhaust gas. If too much ammonia is added or produced, so-called reducing agent slippage occurs, which in other words means that the ammonia is released with the exhaust gas into the environment and is perceptible there, even in small amounts, as an unpleasant smell. Reducing agent slippage also results in increased consumption of reducing agent. In the case of insufficient or substoichiometric metering of ammonia, the nitrogen oxide compounds in the exhaust gas cannot be fully converted, whereby under some circumstances, the required exhaust-gas standards cannot (permanently) be fulfilled. It is, however, a problem to achieve metering which adds ammonia in as exactly stoichiometric a manner as possible if the quantity of nitrogen oxide compounds is subject to intense dynamic variation due to a changing power output of an internal combustion engine, temperature changes of the exhaust gas and of the internal combustion engine and/or due to the effects of further exhaust-gas treatment units.

SUMMARY OF THE INVENTION

It is accordingly an object of the invention to provide a method for metering a reducing agent into an exhaust-gas treatment device, an exhaust-gas treatment device and a motor vehicle, which at least partially overcome the hereinafore-mentioned disadvantages and problems of the heretofore-known methods, devices and vehicles of this general type. In particular, it is sought to specify a method with which reducing agent slippage can be reliably prevented, and thus also an oxidation catalytic converter (barrier catalytic converter) disposed in the exhaust-gas treatment device downstream of the SCR catalytic converter can be avoided. The method should, in particular, also be suitable for an exhaust-gas treatment device in which the SCR catalytic converter has no (significant) storage capacity for the reducing agent. At the same time, the method should permit an efficient and dynamic conversion of nitrogen oxide compounds in the exhaust gas.

With the foregoing and other objects in view there is provided, in accordance with the invention, a method for metering a reducing agent into an exhaust-gas treatment device having a feed point and an SCR catalytic converter for the conversion of nitrogen oxide compounds in the exhaust gas. The method comprises at least the following steps:

a) calculating the following target conversion rates, which indicate what fraction of the nitrogen oxide compounds present in the exhaust gas can be converted by the SCR catalytic converter:
    a.1) a first target conversion rate which is determined from the power output of a connected internal combustion engine;
    a.2) a second target conversion rate which is determined from the mass flow of nitrogen oxide compounds in the purified exhaust gas; and
    a.3) a third target conversion rate which is determined from a ratio between a quantity of nitrogen oxide compounds upstream of the SCR catalytic converter and a quantity of nitrogen oxide compounds downstream of the SCR catalytic converter;

b) selecting the lowest target conversion rate;

c) determining a dosing quantity of reducing agent using the selected target conversion rate; and d) dosing the determined dosing quantity into the exhaust-gas treatment device.

The reducing agent may be metered into the exhaust-gas treatment device in the form of pure ammonia. However, the metering of an aqueous urea solution which is preferably available, for example, under the trademark AdBlue® has a urea content of 32.5%. The aqueous urea solution is converted thermally in the exhaust gas, and/or hydrolytically in a hydrolysis catalytic converter, to form ammonia. The exhaust gas to be treated is conducted in the exhaust-gas treatment device, because the exhaust gas contains an inadmissible or undesirably high quantity of nitrogen oxide compounds. In order to be able to dose a desired quantity of reducing agent in an exact manner, it is the case that the dosing quantity is determined on the basis of multiple target conversion rates. The conversion rate is a percentage value formed from the ratio of nitrogen oxide compounds that have been converted to form nitrogen and water to the total quantity of nitrogen oxides present in the exhaust gas. The total quantity of nitrogen oxides present may in this case be determined by measurement, for example using a nitrogen oxide probe, and/or calculated in model-based fashion, for example by using measurement values from the exhaust gas-producing internal combustion engine, wherein the value is preferably determined by measurement. The quantity of unconverted nitrogen oxide is likewise determined by measurement and/or in model-based fashion. The converted quantity of nitrogen oxides is preferably determined in model-based fashion.

In the method proposed herein, in step b), the lowest of a multiplicity of target conversion rates (measure for the conversion of nitrogen oxides that can actually be attained with the dosed reducing agent) is selected. Thus, a target conversion rate is selected which results in a lower conversion of nitrogen oxides. This is selected because it is the intention to prevent the occurrence of slippage and a release of ammonia from the exhaust system. If different target conversion rates are calculated which are each based on different measurement values and models, the target conversion rate that gives the lowest value is selected with high certainty, in such a way that it can be stated that no reducing agent slippage will occur. This means, in particular, that the target conversion rate that results in the lowest dosing quantity is selected.

In step a.1), a first target conversion rate is calculated which relates to the power output of the connected internal combustion engine in the purified exhaust gases. The first target conversion rate may be a target mass, a target volume at an (average) prevailing exhaust-gas temperature, and/or a standardized target volume (under standardized conditions: 15° C. or 0° C., 1013.25 hPa, 0% relative humidity) of nitrogen oxide compounds in the exhaust gas. The power output of the internal combustion engine at the time of the calculation of the first target conversion rate according to step a.1) is determined, in particular, by the engine controller or from the engine measurements.

For example, the first target conversion rate may be set in such a way that (at present), per kilowatt hour of energy output by the internal combustion engine, a predefined maximum nitrogen oxide emission is adhered to. The predefined nitrogen oxide emission used as a basis may be in relation to the mechanical energy or total energy (mechanical energy and thermal energy) output by the internal combustion engine. In the case of a relation to the total energy output, a nitrogen oxide emission of 182 mg may, for example, be permitted per kilowatt hour of total energy output. This corresponds to a mass flow of approximately 3 mg per minute per kilowatt. In the case of a relation to the mechanical energy output by the internal combustion engine and an assumed efficiency of 38%, a nitrogen oxide quantity of 478 mg may, for example, be permitted per kilowatt hour. This corresponds to a mass flow of approximately 8 mg per minute per kilowatt. Within the scope of the first target conversion rate, it is then predefined by how many percent the emissions of the internal combustion engine must be reduced in order to ensure that the nitrogen oxide emissions can be attained.

In step a.2), a second target conversion rate for the mass flow of nitrogen oxide compounds in the purified exhaust gas is calculated. The purified exhaust gases refer to the exhaust gases that have flowed through the SCR catalytic converter and/or through even further exhaust-gas treatment units in the exhaust-gas treatment device. The second target conversion rate is thus calculated on the basis of a target value for the mass of nitrogen oxide compounds in the exhaust gas downstream of the SCR catalytic converter or in the exhaust gas emerging from the exhaust-gas treatment device. The second target conversion rate may be set on the basis of measurements by using a probe and/or on the basis of model-based calculations. An oxidation catalytic converter model by which the quantity of nitrogen dioxide and other nitrogen oxide compounds is calculated is particularly suitable for this purpose. It is preferable if, for the calculation of the second target conversion rate, the target value for the mass of nitrogen oxide compounds in the exhaust gas is set in a ratio with the mass of nitrogen oxide compounds actually present in the exhaust gas upstream of the SCR catalytic converter. The mass may be measured or, as described further above, calculated in model-based fashion. It is also possible for a measurement and a model-based calculation to be combined with one another in order to determine the mass.

For example, the second target conversion rate may be set in such a way that a maximum mass flow of 1.92 g of nitrogen oxide compounds per hour of operation of the internal combustion engine is generated. Within the scope of the first target conversion rate, it may then be predefined by how many percent the emissions of the internal combustion engine must be reduced in order to ensure that the nitrogen oxide emissions can be attained.

In the calculation of the third target conversion rate in step a.3), it is determined what quantity of nitrogen oxide compounds in the exhaust gas should be reduced, by way of the treatment in the SCR catalytic converter, in relation to the quantity in the non-purified exhaust gas. In particular, an SCR catalytic converter model may be used as a basis for this. The third target conversion rate is, for example, set in model-based fashion based on operating parameters of the SCR catalytic converter. The percentage reduction of nitrogen oxide compounds that can take place in the SCR catalytic converter under the present operating conditions is particularly preferred in this case. Aging of the SCR catalytic converter may also be jointly taken into consideration in this case.

In connection with the third target conversion rate, the expression "non-purified exhaust gas" may also refer, in particular, to the exhaust gas that would exit the exhaust system without treatment by the SCR catalytic converter. For example, the third target conversion rate may be set in such a way that the nitrogen oxide compounds are reduced by 68% in relation to the untreated/non-purified exhaust gas.

After the calculation of these three (present) target values for target conversion rates according to steps a.1), a.2) and a.3), three result values are available, which generally differ from one another. The lowest conversion rate is then selected in step b). In this case, a model may be used as a basis, and/or a so-called "look-up" table may be used. In the "look-up" table, a series of input values are assigned to respective output values based on measurement values from empirical tests. By contrast, in a model, the chemical and physical processes within the model framework are reproduced by feedback control and an input value is converted into an output value. In a complex model, a multiplicity of "look-up" tables may also be provided (in supplementary fashion).

By selecting the lowest target conversion rate, it is ensured that no slippage of reducing agent or ammonia occurs. On the other hand, through the selection of the stated target conversion rates, a very good estimation of the stoichiometrically required quantity of reducing agent can be determined in a very short time.

With the aid of the finally selected (lowest) target conversion rate, a quantity of reducing agent (actually) to be supplied is calculated in step c). This is preferably performed by taking into consideration a series of exhaust-gas parameters, such as in particular at least one of the following parameters: exhaust-gas mass flow; exhaust-gas temperature; rotational speed of the internal combustion engine; and load of the internal combustion engine, wherein the parameters may also, at least in part, be taken into consideration in steps a.1) to a.3).

Finally, in step d), the calculated quantity of reducing agent is dosed into the exhaust-gas treatment device. In this case, the metering is normally performed (directly) upstream of the SCR catalytic converter as viewed in the flow direction of the exhaust gas.

In accordance with another advantageous mode of the method of the invention, at least one of the following parameters is used for the calculation of the target conversion rates in steps a.1) to a.3):
  at least one temperature of the SCR catalytic converter;
  at least one nitrogen oxide concentration in the exhaust gas;
  the rotational speed of the internal combustion engine; and
  the torque of the internal combustion engine.

Through the measurement/calculation of the (present) temperature of the SCR catalytic converter, it is made possible to determine the present conversion characteristics and/or the present ammonia storage capability of the SCR catalytic converter. A "look-up" table based on test results and/or a model of the chemical and physical processes may be used for this purpose. The "look-up" table corresponds to a characteristic map in which parameters for the conversion characteristics and/or the storage capability of the SCR catalytic converter are stored for different temperatures of the SCR catalytic converter.

Through the measurement/calculation of a nitrogen oxide concentration in the exhaust gas downstream of the SCR catalytic converter, a direct measurement of the conversion is made possible, in particular if the nitrogen concentration in the exhaust gas is determined upstream of the SCR treatment and downstream of the SCR treatment.

Through the use of the rotational speed of the internal combustion engine, it is possible to determine the total discharge flow rate of exhaust gas and thus also the spatial velocity through the SCR catalytic converter, which has a considerable influence on conversion rate. By virtue of the torque of the internal combustion engine being taken into consideration, it is possible to infer the pressure conditions and temperature conditions in the combustion chamber of the internal combustion engine, whereby a percentage of nitrogen oxide compounds can be determined.

In particular, the use of a combination of several of the stated parameters can be utilized to factor out or eliminate cross-influences of particular parameters. Through the use of the parameters, it is accordingly possible for a precise quantity of required ammonia or reducing agent to be determined with very short measurement times/calculation times.

In accordance with a further advantageous mode of the method of the invention, the determination of the dosing quantity in step c) is performed by using a controller which has an integral control component and a proportional regulation component, wherein the presently prevailing rate of conversion by the SCR catalytic converter is compared with the selected target conversion rate, and an error is determined, which error is used for the determination of the dosing quantity.

The target conversion rate is, in particular, a model-based intended value/target value. By contrast, the presently prevailing conversion rate is a physically determinable exhaust-gas parameter that can be determined from a measurement, for example of the nitrogen upstream of the SCR catalytic converter and downstream of the SCR catalytic converter. In this case, however, it is also possible for model values to be jointly taken into consideration, in particular if the measurement may include measurement errors due to cross-sensitivities.

In this structural variant, after the selection of the lowest target conversion rate, the target conversion rate is compared with the presently prevailing conversion rate, and an error is correspondingly determined. This may be performed by regulation technology, for example by using an addition or subtraction operator. On the basis of the error, a reducing agent dosing quantity is determined which is made up of, for example, the selected conversion rate plus or minus the error component. The dosing quantity may, however, also be determined from the error and from the preceding conversion rate or target conversion rate in a preceding calculation step of the method. By taking into consideration the error with the aid of a regulator, it is possible to realize particularly good adaptation of the dosing quantity to even rapidly fluctuating dynamic changes in the quantity of nitrogen oxide compounds or to operating conditions of the internal combustion engine and of the exhaust-gas treatment device.

A controller with an integral control component has special characteristics that are particularly advantageous for the calculation of the dosing quantity in step c). The integral control component, which calculates the integral of the preceding measurement inputs in each case, develops a type of "memory" and thus realizes an adapted output variable and smooths out regulation peaks that may be generated by the proportional control component on its own. In particular, the controller does not include any differential control component. With a regulator of this type, it is possible to attain the desired value within a short time, which would be prevented by a differential component. Due to the selection of the lowest target conversion rate, the output variable of a regulator of this type is reliably prevented from running beyond the target output variable.

In accordance with an added advantageous mode of the method of the invention, the presently prevailing conversion rate is calculated from a difference between a second signal of a second nitrogen oxide sensor downstream of the SCR catalytic converter and a first signal of a first nitrogen oxide sensor upstream of the SCR catalytic converter, wherein the first signal is determined before the second signal by a first time interval, and the first time interval corresponds to a flow time of the exhaust gas from the first nitrogen oxide sensor to the second nitrogen oxide sensor.

The present conversion rate can be directly determined through the calculation of the difference between the two signals or measurements of the nitrogen oxide sensors. Through the measurement of the first signal with a time offset, by the magnitude of the first time interval, before the measurement, the present conversion rate is reliably determined even under particularly dynamic operating conditions of the SCR catalytic converter. If one considers the exhaust gas passing the exhaust-gas treatment device as an exhaust-gas column which is pushed out from the internal combustion engine through the exhaust-gas treatment device continuously, it is made possible, by using the first time interval, for always exactly the same section of the exhaust-gas column to be measured with the first signal and the second signal. Therefore, through the comparison of the first signal and the second signal, the conversion rate for the section of the exhaust-gas column can be determined. The first time interval is preferably determined in variable fashion. In this case, the first time interval is determined in accordance with a propagation time of the exhaust gas from the first nitrogen oxide sensor to the second nitrogen oxide sensor. This is preferably performed by using a calculation in a control unit, wherein at least one of the following parameters is preferably taken into consideration:
  exhaust-gas speed,
  rotational speed of an internal combustion engine,
  torque of an internal combustion engine,
  intake air mass flow of an internal combustion engine,
  other engine characteristic values, and
  parameters from the model of the SCR catalytic converter.

In accordance with an additional advantageous mode of the method of the invention, the controller can be operated in a steady-state mode and in a dynamic mode, and for step c), a gradient of a nitrogen oxide quantity in the exhaust gas upstream of the SCR catalytic converter is calculated, wherein the controller is operated in the dynamic mode if the gradient is greater than a threshold value, and the controller is operated in the steady-state mode if the gradient is less than or equal to the threshold value, wherein the target conversion rate selected in step b) is used only in the dynamic mode, and in the steady-state mode, for the calculation of the dosing quantity in step c), a complete conversion of the nitrogen oxide compounds in the exhaust gas is aimed for.

In a steady-state mode, the controller is operated constantly and permits a slow but very precise adaptation of the dosing quantity. It is attempted, on the basis of measurements in the exhaust gas, to identify and fully convert the quantity of nitrogen oxide compounds in the exhaust gas.

In the dynamic mode, the controller is capable of reacting particularly rapidly and effectively to changes in operating parameters of the internal combustion engine and of the exhaust-gas treatment device. For this purpose, the adaptation is less accurate. At the same time, ammonia slippage should be prevented.

The distinction between the dynamic mode and the steady-state mode may be made on the basis of threshold values for certain operating parameters of the motor vehicle. For example, a gradient of the engine rotational speed and/or a gradient of the engine load may be utilized for the distinction. In this case, a "gradient" refers to the consideration of the parameter versus time. If the gradient or gradients exceed a predefined threshold value, the dynamic mode is activated. If the gradients or the gradient fall below the threshold value, the steady-state mode is activated. The distinction between dynamic and steady state is particularly preferably made on the basis of the gradient of the nitrogen oxide mass flow. If the gradient is above a threshold value, the dynamic mode is activated. If the gradient is below the threshold value, the steady-state mode is activated. The gradient of the nitrogen oxide mass flow, the gradient of the load of the internal combustion engine and/or the gradient of the rotational speed may also be jointly taken into consideration in combination with one another in a characteristic map for the distinction of the steady-state mode and of the dynamic mode. In steps a.1), a.2) and a.3), target conversion rates are calculated which, despite not permitting complete conversion of the nitrogen oxide compounds in the exhaust gas, exhibit high certainty that no slippage of ammonia occurs at the SCR catalytic converter and that, instead, ammonia is fully utilized for the reduction of nitrogen oxide compounds. It is therefore particularly advantageous for the target conversion rate selected in step b) to be used for the dynamic model.

By virtue of the distinction being made between a steady-state and a dynamic model, an average is taken over the entire operation of an internal combustion engine (during steady-state operating states and during dynamic operating states) in order to achieve particularly good conversion of ammonia and, at the same time, a particularly high level of safety with regard to ammonia slippage.

The gradient of the nitrogen oxide quantity is the rise or fall of the nitrogen oxide quantity over an observed time period. If the gradient becomes greater, a rapid change in the nitrogen oxide quantity can be inferred, and there is possibly a control error due to an erroneous measurement variable. For as long as the gradient lies below a set threshold value, the controller operates in a steady-state mode. Due to this setting of the threshold value of the change in the nitrogen oxide quantity in the exhaust gas upstream of the SCR catalytic converter, it is made possible to resort to a controller with a simple algorithm which operates with adequate accuracy in the normal situation, and to switch to the more complex dynamic mode only in the event of intense changes.

In accordance with yet another advantageous mode of the method of the invention, the integral control component is reset to zero (0) if an internal combustion engine connected to the exhaust-gas treatment device undergoes a load alteration. In this case, a load alteration refers to an abrupt, rapid change in the load state of the internal combustion engine or of the load-dependent operating conditions of the internal combustion engine, in particular a change from a load state of, for example, more than 50% of a maximum load of the internal combustion engine to idle.

As a result of such a load alteration at the internal combustion engine, intensely varying conversion conditions for nitrogen oxide compounds can arise. In order to ensure that, in this case, in the event of an intense change, there are no adverse effects due to the damping action of the integral control component, the memory of which is to be maintained, the integral control component is set to zero in the event of a load alteration of this type. Due to this simple measure, the controller adapts rapidly and effectively to the new conditions and builds up an integral control component that is adapted to the newly present load state. In this way, a situation is prevented in which control errors arise during the load alteration transition and, in the event of load alterations in rapid succession, such as for example when stopped at a traffic signal, the control error has to be trailed, as ballast, so to speak, through the different load states. A very high integral control component that has been built up due to prevailing operating conditions of an internal combustion engine (of a prevailing load state) may no longer be suitable in the event of a changed load state of the internal combustion engine, and may even lead to a severe control error with regard to the dosing quantity of the reducing agent. It is therefore advantageous for the integral component to be reset to zero in such a situation.

In accordance with yet a further advantageous mode of the method of the invention, the SCR catalytic converter has a coating which, under normal operating conditions of the SCR catalytic converter, has no storage capacity for reducing agent, and no additional storage catalytic converter for reducing agent is provided in the exhaust-gas treatment device.

A storage capacity for reducing agent refers, in particular, to a storage capacity for ammonia. A storage capacity for ammonia may be realized, in particular, by using suitable coating constituents in the SCR catalytic converter. The SCR catalytic converter in the present exhaust-gas treatment device preferably has no coating constituents that permit storage of ammonia. It is preferably also the case that no further catalytic converter and no further component that permits storage of ammonia are provided in the exhaust-gas treatment device.

With the proposed method, it is possible to use an SCR catalytic converter without storage capability or only a very low storage capability for a reducing agent or ammonia. A catalytic converter of this type has, for example, a coating which includes vanadium pentoxide and no zeolites. In the case of an exhaust-gas treatment device of this type, too, it is hereby possible, in a very precise manner and in real time, for reducing agent to be dosed in such an amount that, firstly, the most substantial possible conversion of the nitrogen oxides is performed, and at the same time, reducing agent slippage is prevented.

It is, however, pointed out at this juncture that the method is likewise suitable for exhaust gas treatment devices which use an SCR catalytic converter with storage capability. It may be necessary in this case to use, as further input variables, a storage model or a corresponding "look-up" table (a corresponding characteristic map).

With the objects of the invention in view, there is also provided an exhaust-gas treatment device for the purification of the exhaust gases of an internal combustion. The exhaust gas treatment device comprises at least the following components:

an SCR catalytic converter for performing a selective catalytic reduction of nitrogen oxide compounds in the exhaust gas;

a feed point for the feed of reducing agent, the feed point being disposed upstream of the SCR catalytic converter in the exhaust-gas flow direction;

a second nitrogen oxide sensor downstream of the SCR catalytic converter in the exhaust-gas flow direction; and a control unit which is constructed to control metering of reducing agent at the feed point, wherein the control unit is set up for carrying out the described method.

The exhaust-gas treatment device has an SCR catalytic converter in which nitrogen oxide compounds are reduced to form nitrogen and water. For this purpose, the SCR catalytic converter generally has a coating. The SCR catalytic converter is preferably coated with a coating which promotes reduction of nitrogen oxide compounds with ammonia but which has no or only very low ammonia storage capability. For example, the coating has vanadium pentoxide and there are no zeolites in the coating.

In an alternative embodiment, it is however also possible for the SCR catalytic converter to have a coating which is capable of absorbing ammonia in order to release the ammonia again in the presence of nitrogen oxide compounds for the purpose of selective catalytic reduction, and which thus has storage characteristics. This is achieved, for example, through the use of zeolites.

A feed point for reducing agent or ammonia is disposed upstream of the SCR catalytic converter in such a way that, for example through an injector, a urea-water solution is added in atomized form to the exhaust gas and is converted thermolytically and/or hydrolytically therein to form ammonia which is then available for the SCR reaction in the SCR catalytic converter. In this case, the exhaust gas serves as a transport medium and, due to its temperature and chemical composition, as a facilitator for the conversion of urea-water solution into ammonia.

Furthermore, the exhaust-gas treatment device has a second nitrogen oxide sensor downstream of the SCR catalytic converter in the exhaust-gas flow direction. The second nitrogen oxide sensor is, in particular, set up for sensing measurement values of a first nitrogen oxide sensor upstream of the SCR catalytic converter in the exhaust-gas flow direction or model values of a nitrogen oxide compound model, for example on the basis of engine characteristic values and exhaust-gas measurements or exhaust-gas models. An (optional) first nitrogen oxide sensor may be provided upstream of the SCR catalytic converter in the exhaust-gas flow direction.

Furthermore, a control unit is provided which is constructed and set up to control metering of reducing agent. A control unit of this type includes, for example, a processor in which calculations are performed in accordance with a control algorithm and output signals for the metering of reducing agent are output. The control unit may preferably directly control an injector for the reducing agent and/or access a dedicated control unit of the injector. Input variables of the control unit may in this case be engine characteristic values, exhaust gas characteristic values, lambda probe values and/or nitrogen oxide sensor values. The input variables themselves may even also be indirect calculation values which have been determined on the basis of measurement values using models or "look-up" tables (characteristic maps). The control unit preferably has integrated within it the calculation models for the control of the exhaust-gas device and, in particular, for those values of the connected internal combustion engine which are taken into consideration.

It is considered to be advantageous for a control unit for carrying out the described method to be capable of readjusting in real time to the rapid succession of different exhaust-gas compositions and temperatures, because there is no buffer effect, or only a small buffer effect, generated by a storage catalytic converter. For this purpose, it is expedient for the calculation of the output variable to be passed through a proportional-integral controller, because this can achieve particularly rapid approximation to the required measurement variable and, at the same time, the controller value exhibits stable behavior within a load state due to the integral component. In order to ensure that overshooting does not occur, it is advantageous if, on the basis of multiple calculations based on different input variables, the lowest output variable in each case is selected. In particular in the case of load alterations, however, it is also advantageous in this case for the integral component to be reset to zero in order to be able to achieve rapid adaptation to the new load situation again.

With the objects of the invention in view, there is concomitantly provided a motor vehicle, comprising an internal combustion engine and an exhaust-gas treatment device as described above for purification of the exhaust gases of the internal combustion engine.

Motor vehicles must demand widely varying levels of power of the internal combustion engine in a wide variety of different situations. As a result, the internal combustion engine only rarely runs in an optimum state for which the exhaust-gas treatment device can be set. For this purpose, it is necessary to set up a fast and effective control system for the selective reduction of nitrogen oxide compounds, which control system is set up for a wide variety of load states and, in particular, rapid load alterations. With the use of the exhaust-gas treatment device and the above-described method, particularly efficient and reliable adaptation of the metering of reducing agent to the respectively required conversion rate is possible.

Other features which are considered as characteristic for the invention are set forth in the appended claims, noting that the features specified individually in the claims may be combined with one another in any desired technologically meaningful way and may be supplemented by explanatory facts from the description and details from the figures, with further embodiments of the invention being specified.

Although the invention is illustrated and described herein as embodied in a method for metering a reducing agent into an exhaust-gas treatment device, an exhaust-gas treatment device and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
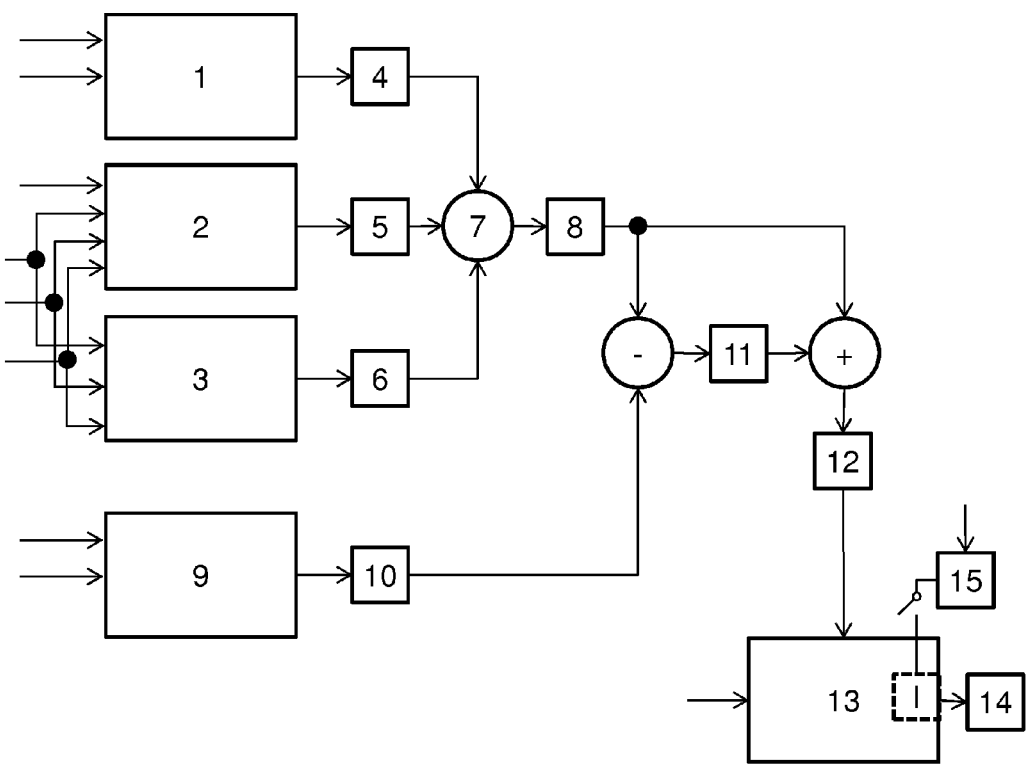
FIG. 1 is a schematic and block diagram illustrating the method according to the invention as described above.

Referring now in detail to the figures of the drawing for explaining the invention and the technical field in more detail by showing particularly preferred structural variants to which the invention is not restricted and in which proportions are diagrammatic, and first, particularly, to FIG. 1 thereof, there is seen an exemplary diagram illustrating the above-described method in which a first target conversion rate 4 is calculated on the basis of input values in relation to a power output in a function field 1. A second target conversion rate 5 for a mass flow of nitrogen oxide compounds in purified exhaust gas is calculated on the basis of input variables in a function field 2. A third target conversion rate 6, by which nitrogen compounds in the exhaust gas should be reduced, is calculated in a third function field 3. The input variables for the function fields 1 to 3 are merely shown schematically therein and by way of example. It would, for example, be possible for the speed of the internal combustion engine and the torque of the internal combustion engine to be input variables for the function field 1. It would, for example, be possible for the SCR catalytic converter temperature and the SCR catalytic converter spatial velocity to be input variables for the function field 3, in which they are based, for example, on an SCR catalytic converter model. The same model values as in the function field 3 could also be used as input variables for the function field 2. A relative quantity of nitrogen dioxide upstream of an SCR catalytic converter 23 (seen in FIG. 4) could additionally be an input variable. The latter may in turn correspond to a model, for example an oxidation catalytic converter model. The function field 2 could furthermore also use the input variable of the nitrogen oxide compound mass flow upstream of the SCR catalytic converter 23 (seen in FIG. 4).

The lowest target conversion rate of the target conversion rates 4 to 6 is selected in a minimum operator 7. A presently prevailing conversion rate 10 is calculated in a function field 9. This may be calculated, for example, on the basis of the nitrogen oxide compound concentration upstream of the SCR catalytic converter 23 (seen in FIG. 4) and the nitrogen oxide compound concentration downstream of the SCR catalytic converter 23. The selected lowest target conversion rate together with the presently prevailing conversion rate 10 forms an error 11. A dosing quantity 12 is determined, specifically by subtraction or addition, from the selected lowest target conversion rate and the error 11. A dosing signal 14, with which the dosing of the calculated quantity is initiated at an injector, is calculated in the function field 13 which includes, for example, a proportional-integral regulator. As is schematically illustrated, the function field 13 also has a further input, for example for information regarding the state of a feed point 24 (see FIG. 4). An integral component I is likewise schematically illustrated in a dashed box in the function field 13. The integral component can be reset to zero on the basis of a load alteration signal 15.

Figure 2:
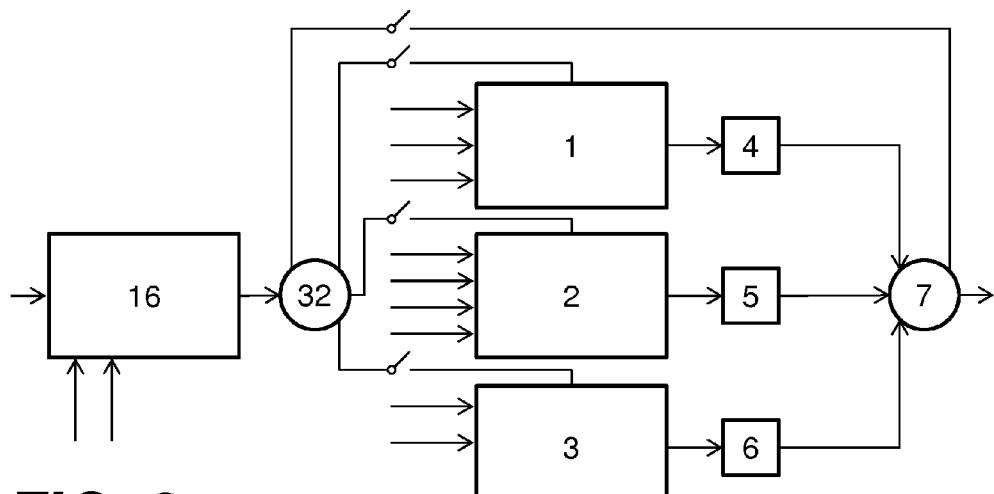
FIG. 2 is an alternative schematic and block diagram of a portion of the diagram of FIG. 1.

FIG. 2 illustrates an alternative input layout of the function fields 1 to 3 from the schematic diagram in FIG. 1. In this case, there is provided, upstream, a function field 16 which, on the basis of input variables (which are indicated therein merely by way of example and schematically), causes a downstream mode operator 8 to switch from the steady-state to the dynamic mode of the method. The layout in this case is purely schematic, and other configurations are possible, such that, in the steady-state mode, only one of the function fields 1 to 3 or an alternative, conventional function field is implemented. In the dynamic mode, all of the function fields and the minimum operator 7 are activated. In this example, in the static mode, only one of the function fields is activated, and the minimum operator 7 is thus, if appropriate, deactivated. It is, however, also possible for the minimum operator 7 to be switched to a channel operator for one of the target values 4 to 6 and for the function fields 1 to 3 to continue to be operated in parallel in the dynamic operating mode. The connection of the function fields 1 to 3 is performed in each case by way of a switching device 32.

Figure 3:
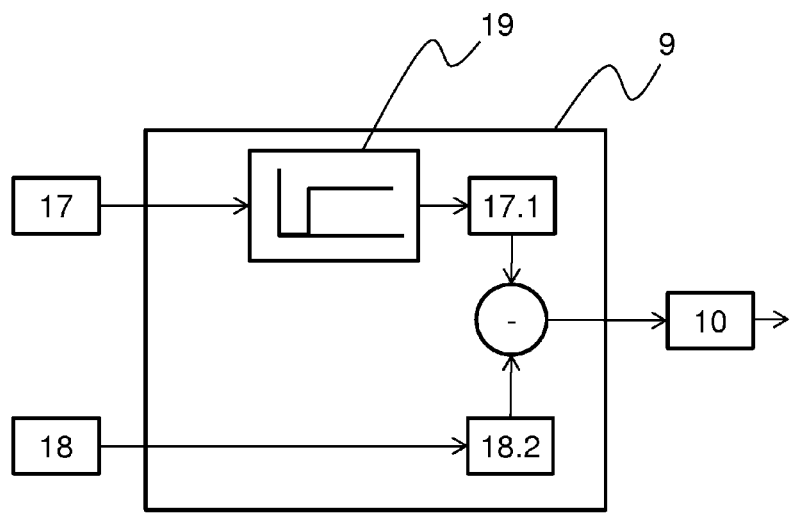
FIG. 3 is a block diagram of a possible reference value generator.

FIG. 3 shows a possible embodiment of the function field 9 for the calculation of the prevailing conversion rate, which may be connected according to FIG. 1. For illustrative purposes, in this example, the input variable of the function field 9 is restricted to a first signal 17 of a first nitrogen oxide sensor 27 (seen in FIG. 4) and a second signal 18 of a second nitrogen oxide sensor 26 (seen in FIG. 4). In this case, the first signal 17 is delayed by a first time interval 19, in such a way that, for the differential operator, input variables 17.1 at a first time and an input variable 18.2 at a second time are compared with one another, and the presently prevailing conversion rate 10 is calculated therefrom. In this case, the first time interval corresponds to the time required for the exhaust gas to travel the distance from the first nitrogen oxide sensor 27 to the second nitrogen oxide sensor 26, so that the same exhaust-gas section is compared upstream and downstream of the SCR catalytic converter 23 (see FIG. 4).

Figure 4:
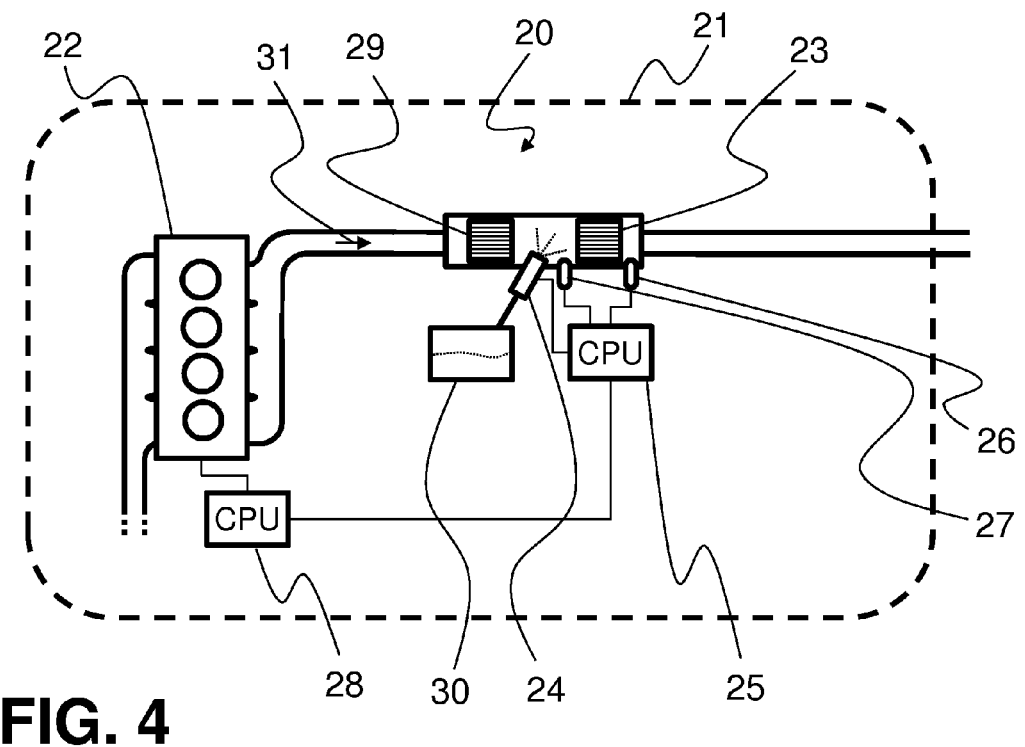
FIG. 4 is a diagrammatic, plan view of a motor vehicle having the exhaust-gas treatment device.

FIG. 4 diagrammatically illustrates a motor vehicle 21 having an exhaust-gas treatment device 20 and an internal combustion engine 22. In this example, the exhaust-gas treatment device 20 includes the SCR catalytic converter 23 and an oxidation catalytic converter 29. The feed point 24 for the metering of ammonia is disposed between the two catalytic converters. The feed point is in the form of an injector for a urea-water solution fed from a reducing agent tank 30. The feed point 24 is controlled by a control unit 25. In this case, by way of example, the control unit 25 receives the first signal 17 (seen in FIG. 3) from the first nitrogen oxide sensor 26 upstream of the SCR catalytic converter 23 in an exhaust-gas flow direction 31 and the second signal 18 (seen in FIG. 3) from the second nitrogen oxide sensor 26 downstream of the SCR catalytic converter 23 as input variables. Furthermore, one input variable is generated by an engine control unit 28.

Through the use of the proposed method and the corresponding devices, it is possible to control a highly dynamic and efficient feed of reducing agent into the exhaust-gas treatment device. In this case, there is no need for compensation by using an SCR catalytic converter with storage capability.

The invention claimed is:

1. A method for metering a reducing agent into an exhaust-gas treatment device having a feed point and an SCR catalytic converter for the conversion of nitrogen oxide compounds in exhaust gas from a connected internal combustion engine, the method comprising the following steps:
   a) calculating the following target conversion rates indicating what fraction of the nitrogen oxide compounds present in the exhaust gas can be converted by the SCR catalytic converter:
      a.1) a first target conversion rate determined from a power output of the connected internal combustion engine;
      a.2) a second target conversion rate determined from a mass flow of nitrogen oxide compounds in purified exhaust gases; and
      a.3) a third target conversion rate determined from a ratio between a quantity of nitrogen oxide compounds upstream of the SCR catalytic converter and a quantity of nitrogen oxide compounds downstream of the SCR catalytic converter;
   b) selecting the lowest target conversion rate;
   c) determining a dosing quantity of reducing agent using the selected target conversion rate; and
   d) dosing the determined dosing quantity into the exhaust-gas treatment device.

2. The method according to claim 1, which further comprises calculating the target conversion rates in steps a.1) to a.3) by using at least the following parameters:
   at least one temperature of the SCR catalytic converter;
   at least one nitrogen oxide concentration in the exhaust gas;
   a rotational speed of the internal combustion engine; and
   a torque of the internal combustion engine.

3. The method according to claim 1, which further comprises determining the dosing quantity in step c) by using a control unit having an integral control component and a proportional control component, comparing a presently prevailing rate of conversion by the SCR catalytic converter with the selected target conversion rate, and determining an error being used for the determination of the dosing quantity.

4. The method according to claim 3, which further comprises:
   calculating the presently prevailing conversion rate from a difference between a first signal of a first nitrogen oxide sensor upstream of the SCR catalytic converter in an exhaust-gas flow direction and a second signal of a second nitrogen oxide sensor downstream of the SCR catalytic converter in the exhaust-gas flow direction;
   determining the first signal at a first time interval before the second signal; and
   setting the first time interval to correspond to a flow time of the exhaust gas from the first nitrogen oxide sensor to the second nitrogen oxide sensor.

5. The method according to claim 3, which further comprises:
   selectively operating the control unit in a steady-state mode and in a dynamic mode;
   calculating a gradient of a nitrogen oxide quantity in the exhaust gas upstream of the SCR catalytic converter for step c);
   operating the control unit in the dynamic mode if the gradient is greater than a threshold value, and operating the control unit in the steady-state mode if the gradient is less than or equal to the threshold value;
   using the target conversion rate selected in step b) only in the dynamic mode; and
   aiming for a complete conversion of the nitrogen oxide compounds in the exhaust gas in the steady-state mode, for the calculation of the dosing quantity in step c).

6. The method according to claim 3, which further comprises resetting the integral control component to zero if the internal combustion engine connected to the exhaust-gas treatment device undergoes a load alteration.

7. The method according to claim 1, which further comprises providing the SCR catalytic converter with a coating which, under normal operating conditions of the SCR catalytic converter, has no storage capacity for reducing agent, and providing no additional storage catalytic converter for reducing agent in the exhaust-gas treatment device.

8. An exhaust-gas treatment device for the purification of exhaust gases of an internal combustion engine, the exhaust-gas treatment device comprising:
   an SCR catalytic converter configured to perform a selective catalytic reduction of nitrogen oxide compounds in the exhaust gas;
   a feed point configured to feed reducing agent, said feed point disposed upstream of said SCR catalytic converter in an exhaust-gas flow direction;
   a second nitrogen oxide sensor downstream of said SCR catalytic converter in said exhaust-gas flow direction; and
   a control unit configured to control metering of reducing agent at said feed point, said control unit programmed for:
   a) calculating the following target conversion rates indicating what fraction of the nitrogen oxide compounds present in the exhaust gas can be converted by said SCR catalytic converter:
      a.1) a first target conversion rate determined from a power output of the internal combustion engine;
      a.2) a second target conversion rate determined from a mass flow of nitrogen oxide compounds in purified exhaust gases; and
      a.3) a third target conversion rate determined from a ratio between a quantity of nitrogen oxide compounds calculated upstream of the SCR catalytic converter and a quantity of nitrogen oxide compounds downstream of the SCR catalytic converter;
   b) selecting the lowest target conversion rate;
   c) determining a dosing quantity of reducing agent using the selected target conversion rate; and
   d) dosing the determined dosing quantity into said feed point.

9. A motor vehicle, comprising:
   an internal combustion engine; and
   an exhaust-gas treatment device according to claim 8 for the purification of exhaust gases of said internal combustion engine.

* * * * *